United States Patent [19]

Gray

[11] Patent Number: 4,608,954
[45] Date of Patent: Sep. 2, 1986

[54] INPUT CIRCUIT FOR AN ELECTRONIC VEHICLE SPEED CONTROL UNIT

[75] Inventor: Larry O. Gray, Laurinburg, N.C.

[73] Assignee: Dana Corporation, Toledo, Ohio

[21] Appl. No.: 603,122

[22] Filed: Apr. 23, 1984

[51] Int. Cl.$^4$ ............................................. F02D 11/10
[52] U.S. Cl. .................................... 123/352; 123/494; 123/484; 307/519; 324/169; 324/170; 324/362
[58] Field of Search ........................ 123/494, 484, 352; 307/260, 261, 362, 519; 324/169, 170; 328/74, 150, 151

[56] References Cited

U.S. PATENT DOCUMENTS

| 3,500,801 | 3/1970 | Long | 123/484 |
| 3,500,802 | 3/1970 | Long | 123/484 |
| 3,737,681 | 6/1973 | Rothermel | 307/519 |
| 3,942,113 | 3/1976 | Wilson | 324/170 |
| 4,166,248 | 8/1979 | Bianchi | 324/169 |
| 4,363,979 | 12/1982 | Honig | 307/519 |
| 4,495,913 | 1/1985 | Gray | 123/352 |
| 4,527,076 | 7/1985 | Matsuo | 307/362 |

FOREIGN PATENT DOCUMENTS

| 866055 | 6/1941 | France | 324/170 |
| 54-109537 | 4/1981 | Japan | 324/170 |

Primary Examiner—Ronald B. Cox
Attorney, Agent, or Firm—Willian Brinks Olds Hofer Gilson & Lione

[57] ABSTRACT

An improved input circuit for an electronic vehicle speed control unit is disclosed. An ignition current sensor coil is adapted to have a voltage differential signal induced therein each time an ignition pulse is generated by the vehicle engine. Electrical noise signals generated by the vehicle engine appear as common mode signals across the ignition current sensor coil. The ignition current sensor coil is connected at each end to a capacitor, both of which are connected to ground potential. The ends of the ignition current sensor coil are further connected to the inputs of a differential amplifier. The capacitors appear in a series loop with the ignition current sensor coil for the differential voltage signals and, consequently, provide tuning for inductance. However, the capacitors appear in parallel with one another to ground potential with respect to the common mode noise signals, thereby providing high frequency noise rejection for the input circuit. The differential amplifier further rejects the common mode noise signal applied to the inputs thereof.

36 Claims, 3 Drawing Figures

INPUT CIRCUIT FOR AN ELECTRONIC VEHICLE SPEED CONTROL UNIT

BACKGROUND OF THE INVENTION

The present invention relates in general to vehicle speed control systems and in particular to an improved input circuit for an electronic vehicle speed control unit.

Vehicle speed control units are widely known in the art and are adapted to maintain a vehicle at a constant predetermined speed despite varying engine loads, such as are imposed by the course of the road or the wind. Because of their reliability, accuracy, and inexpensiveness, fluid-actuated vehicle speed control units have become the dominant factor in the marketplace. Such speed control units typically utilize vacuum from the vehicle engine manifold as the actuating force. The vacuum is selectively supplied to a bellows connected to the engine throttle linkage, thereby increasing or decreasing the throttle position to advance or retard the vehicle speed. The control unit for such a system typically compares a signal representing the actual vehicle speed with a signal representing the desired vehicle speed and adjusts the vacuum level supplied to the bellows accordingly.

Frequently, electronic control circuits are utilized to control the supply of vacuum to the bellows. However, such electronic control circuits are subject to unreliable operation or failure because of the large amount of electrical noise present in the vehicle engine. Such noise is typically generated by the vehicle ignition system and can adversely affect the signal representing the actual speed of the vehicle. Accordingly, it would be desirable to provide an input circuit for the electronic vehicle speed control unit which is resistant to such spurious noise signals.

SUMMARY OF THE INVENTION

The present invention relates to an improved input circuit for an electronic vehicle speed control unit. An ignition current sensor coil is adapted to have a voltage differential signal induced therein each time an ignition pulse is generated by the vehicle engine. Electrical noise signals generated by the vehicle engine appear as common mode signals across the ignition current sensor coil. The ignition current sensor coil is connected at each end to a capacitor, both of which are connected to ground potential. The ends of the ignition current sensor coil are further connected to the inputs of a differential amplifier. The capacitors appear in a series loop with the ignition current sensor coil for the differential voltage signals and, consequently, provide tuning for its inductance. However, the capacitors appear in parallel with one another to ground potential with respect to the common mode noise signals, thereby providing high frequency noise rejection for the input circuit. The differential amplifier further rejects the common mode noise signals applied to the inputs thereof.

It is an object of the present invention to provide an improved input circuit for an electronic vehicle speed control unit.

It is another object of the present invention to provide such an input circuit with a good common mode noise signal rejection capability.

It is a further object of the present invention to provide such an input circuit including a differential amplifier.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
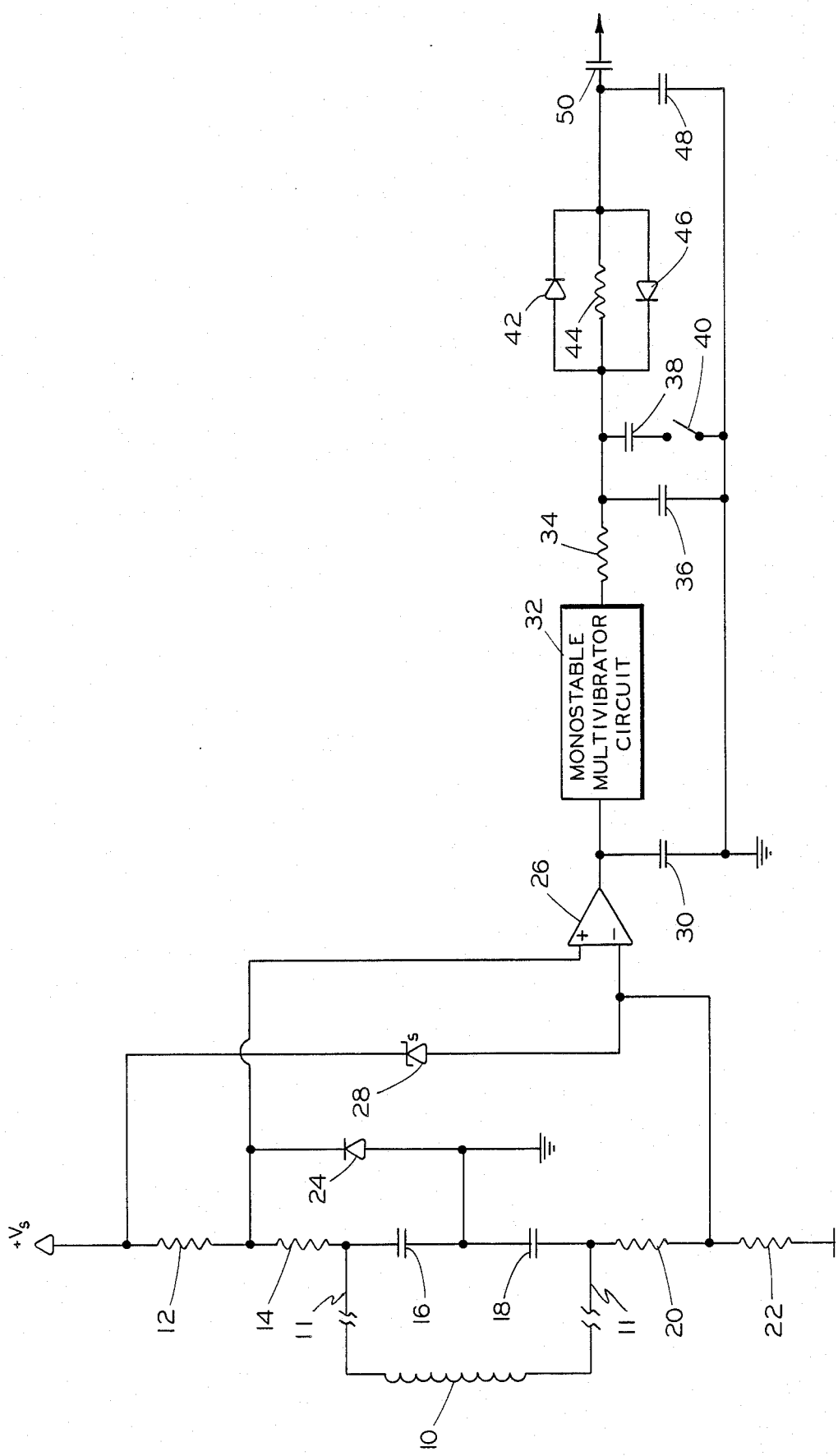
FIG. 1 is a schematic diagram of an improved input circuit for an electronic vehicle speed control unit in accordance with the present invention.

Referring now to FIG. 1, there is illustrated an improved input circuit for an electronic vehicle speed control unit (not shown). The input circuit is adapted to generate a signal representing the actual speed of the vehicle to the electronic vehicle speed control unit. An ignition current sensor coil 10 is provided which is adapted to be wound about an iron or ferrite ring or other toroidal core (not shown) in a manner described and illustrated in U. S. Pat. No. 4,495,913, issued Jan. 29, 1985, the disclosure of which is hereby incorporated by reference. When the ring is disposed about an ignition cable in the vehicle engine, a voltage differential is induced in the ignition current sensor coil 10 each time an ignition pulse is generated in the ignition cable by the vehicle ignition system. Thus, the ignition current sensor coil 10 provides a pulsating electrical voltage signal which is proportional in frequency to the actual speed of the vehicle engine.

The ignition current sensor coil 10 is typically connected by a pair of conductors 11 to the input circuit of the electronic vehicle speed control unit. The conductors 11 typically extend in a twisted pair configuration about the vehicle engine from the ignition current sensor coil 10 to the input circuit. The input circuit includes a resistor 12, a resistor 14, a capacitor 16, a capacitor 18, a resistor 20, and a resistor 22, all of which are connected in series between a source of positive voltage +Vs and ground potential. One conductor 11 connected to the ignition current sensor coil 10 is connected to the junction between the resistor 14 and the capacitor 16, while the other conductor 11 connected to the ignition current sensor coil 10 is connected to the junction between the capacitor 18 and the resistor 20. The junction between the capacitor 16 and the capacitor 18 is connected to ground potential and also to the anode of a diode 24. The cathode of the diode 24 is connected to the junction between the resistors 12 and 14 and also to the non-inverting input of a differential amplifier 26. The inverting input of the differential amplifier 26 is connected to the junction between the resistors 20 and 22 and also to the anode of a Schottky diode 28. The cathode of the Schottky diode 28 is connected to the +Vs voltage source.

The output of the differential amplifier 26 is connected through a capacitor 30 to ground potential. The output of the differential amplifier 26 is also connected to the input of a conventional monostable multivibrator circuit 32. The output of the monostable multivibrator circuit 32 is connected through a resistor 34 to a capacitor 36 and a capacitor 38. The capacitor 36 is connected to ground potential, while the capacitor 38 is connected through a single pole, single throw switch 40 to ground potential. The resistor 34 is further connected to the junction between the anode of a diode 42, a resistor 44, and the cathode of a diode 46. The cathode of the diode 42, the resistor 44, and the anode of the diode 46 are all connected to the junction between a capacitor 48 and a capacitor 50. The capacitor 48 is connected to ground potential, while the capacitor 50 is connected to the actual vehicle speed signal input of the electronic vehicle speed control unit (not shown).

The above-described circuit elements 34 through 50 form a filter network which is described in detail in the patent previously referred to. The switch 40 is provided to selectively include or exclude the capacitor 38 in the filter network. When the switch 40 is closed, the effective capacitance is increased, thereby providing a somewhat slower response in the filter network to signals of changing magnitude. Such slower response is desirable in certain instances, such as in vehicles having an automatic transmission, as opposed to a manual transmission.

The resistors 12, 14, 20, and 22 are provided to generate bias signals to the inputs of the differential amplifier 26 at predetermined voltage levels defining a voltage range. It has been found desirable to select the resistors 12 and 22 of equal value, and further to select the resistors 14 and 20 of equal value. Also, the values of the resistors 12 and 22 can be selected to be quite large with respect to the values of the resistors 14 and 20. By selecting the values of the resistors 12, 14, 20, and 22 in this manner, the inverting and non-inverting inputs of the differential amplifier 26 will be biased at voltage levels which are less than and greater than, respectively, one-half of the voltage level of the +Vs voltage supply by a predetermined relatively small magnitude.

The diodes 24 and 28 are provided to limit the voltage levels applied to the non-inverting and inverting inputs, respectively, of the differential amplifier 26. Thus, the minimum voltage which can be applied to the non-inverting input will be a negative voltage having a magnitude equal to the voltage required to forward bias the diode 24 (typically 0.6 volts) below ground potential. Similarly, the maximum voltage which can be applied to the non-inverting input will be a positive voltage having a magnitude equal to the voltage required to forward bias the Schottky diode 26 (typically 0.2 volts) above the +Vs voltage source level.

In operation, when an ignition pulse is generated in the ignition cable by the vehicle ignition system, a voltage differential is induced across the ignition current sensor coil 10. The capacitors 16 and 18 form a loop with the ignition current sensor coil 10 and provide tuning for its inductance. Thus, the capacitors 16 and 18 appear in series across the ignition current sensor coil 10 with respect to the induced voltage differential signal. Accordingly, a "ringing" sinusoidal voltage differential signal of exponentially diminishing magnitude will be generated across the ignition current sensor coil 10 each time an ignition pulse is generated. As described above, the ends of the ignition current sensor coil 10 are connected through the conductors 11 and the resistors 14 and 20 to the non-inverting and inverting inputs, respectively, of the differential amplifier 26. Since the inputs to the differential amplifier 26 are biased at predetermined voltage levels defining a voltage range, those portions of the "ringing" signal which have a greater voltage differential than the voltage range will cause the normally low output of the differential amplifier 26 to go high. The capacitor 30 filters the output signal of the differential amplifier 26 such that only a single pulse is applied to the input of the monostable multivibrator circuit 32 for each ignition pulse.

As mentioned above, undesirable electrical noise is often generated by a vehicle engine, which noise can cause unreliable operation or failure of the speed control unit by distorting the actual vehicle speed signal. Despite their twisted pair configuration, the conductors 11 connecting the ignition current sensor coil 10 to the input circuit of the electronic vehicle speed control unit are vulnerable to such noise, since they are relatively lengthy and necessarily extend about the vehicle engine. One characteristic of such electrical noise, however, is that virtually identical noise signals will be generated simultaneously on each of the conductors 11. Thus, the noise signals are common mode signals with respect to the capacitors 16 and 18. The capacitors 16 and 18 appear in parallel with one another with respect to such common mode signals, since they are each connected to ground potential. The increased effective capacitance provides a short circuit for some of the high frequency components of the noise signals to ground potential. More importantly, however, since the common mode signals are superimposed on the voltage differential signals and applied to the inputs of the differential amplifier 26, the noise signals will have little effect, if any, on the output signal from the differential amplifier 26. This is because the differential amplifier 26, as is well known, is responsive only to input signals having different voltage levels. The diodes 24 and 28 provide a signal clamping means for the inputs of the differential amplifier 26, as described above, and prevent them from being driven beyond their common mode range. Thus, the input circuit of the present invention provides an effective means for rejecting of such common mode noise signals.

Figure 2:
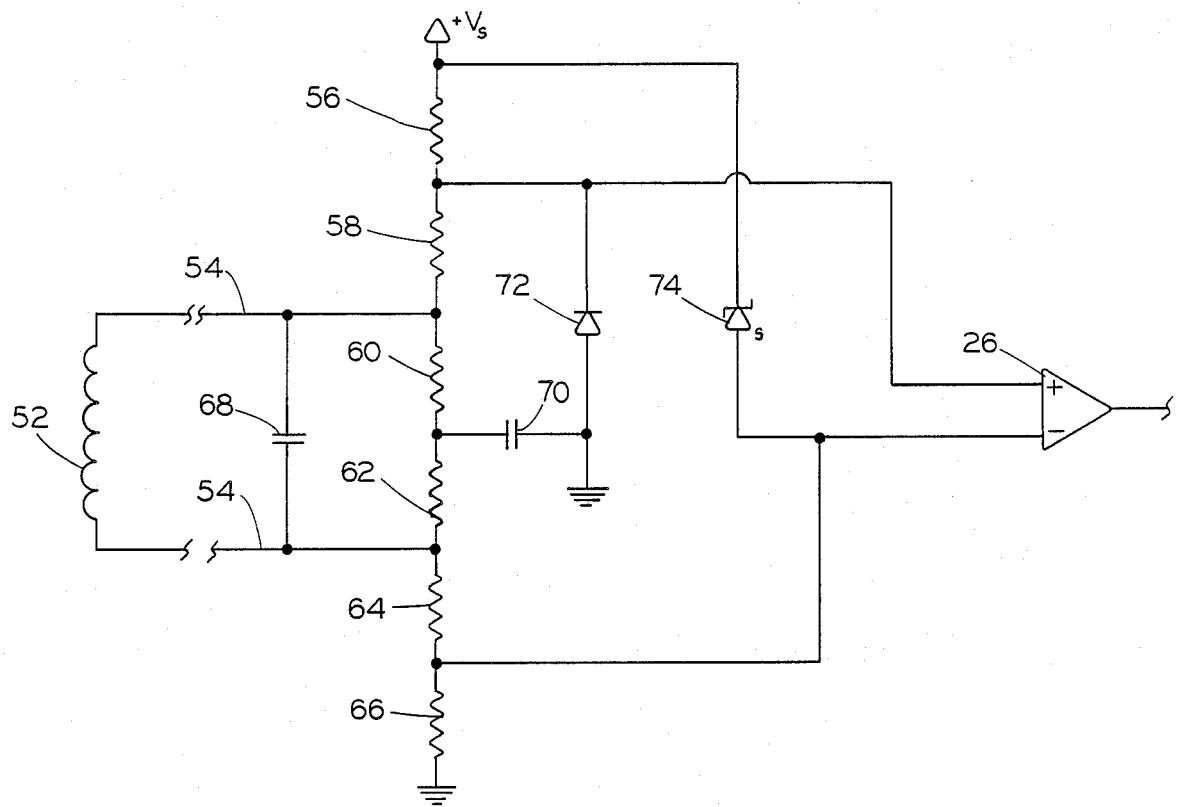
FIG. 2 is a schematic diagram of a portion of a first alternate embodiment of the improved input circuit illustrated in FIG. 1.

Referring now to FIG. 2, there is illustrated a first alternate embodiment of the present invention. As illustrated therein, the input circuit includes an ignition current sensor coil 52 which is connected by a pair of conductors 54 to the input circuit as described above. The input circuit includes a plurality of resistors 56, 58, 60, 62, 64, and 66, all of which are connected in series between a source of positive voltage +Vs and ground potential. One conductor 54 connected to the ignition current sensor coil 52 is connected to the junction between the resistor 58 and the resistor 60, while the other conductor 54 connected to the ignition current sensor coil 52 is connected to the junction between the resistor 62 and the resistor 64. A capacitor 68 is connected between the two conductors 54. The junction between the resistor 60 and the resistor 62 is connected through a capacitor 70 to ground potential. The junction between the resistor 56 and the resistor 58 is connected to the cathode of a diode 72 and also to the non-inverting input of the above-discussed differential amplifier 26. The anode of the diode 72 is connected to ground potential. The junction between the resistor 64 and the resistor 66 is connected to the anode of a Schottky diode 74 and also to the inverting input of the differential amplifier 26. The cathode of the Schottky diode 74 is connected to the +Vs voltage source. The output of the differential amplifier 26 is connected to the circuit elements 34 through 50 of the filter network as described above.

In operation, when an ignition pulse is generated in the ignition cable by the vehicle ignition system, a voltage differential is induced across the ignition current sensor coil 52. The capacitor 68 and the resistors 60 and 62 form a tank circuit with the ignition current sensor coil 52. The capacitor 68 provides tuning for the inductance of the ignition current sensor coil 52, thus producing a "ringing" sinusoidal voltage differential signal as described above. The resistors 60 and 62 appear in series for such voltage differential signal and tend to damp the "ringing" thereof considerably. As described above, those portions of the "ringing" signal which have a greater voltage differential than the voltage range determined by the resistive voltage divider network consisting of the resistors 56 through 66 will cause the normally low output of the differential amplifier 26 to go high.

The resistors 60 and 62 appear in parallel with respect to common mode noise signals generated on the conductors 54. Thus, their effective resistance is diminished somewhat. For example, if the resistors 60 and 62 are of equal value, their effective resistance with respect to the common mode noise signals will be one half of that value. Since the resistors 60 and 62 are connected through a capacitor 70 to ground potential, the high frequency components of the common mode signals will be shorted to ground potential. Additionally, the remaining portions of the common mode noise signals will have little effect on the output signal from the differential amplifier 26 for the reasons described above.

Figure 3:
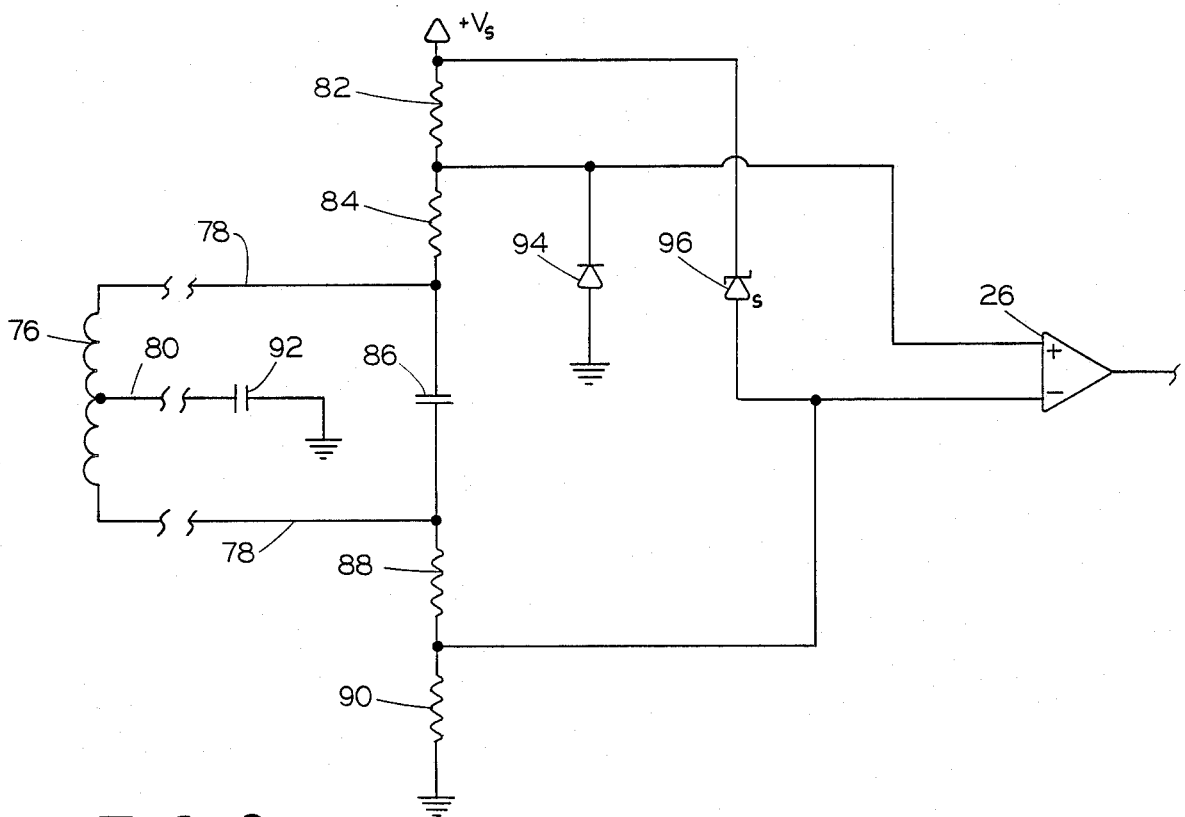
FIG. 3 is a schematic diagram of a portion of a second alternate embodiment of the improved input circuit illustrated in FIG. 1.

Referring now to FIG. 3, there is illustrated a second alternate embodiment of a portion of the improved input circuit illustrated in FIG. 1. As shown therein, a center-tapped ignition current sensor coil 76 is connected at its ends by a pair of conductors 78 to the input circuit of the electronic vehicle speed control unit. The center tap of the ignition current sensor coil 76 is connected by a third conductor 80 to the input circuit. The input circuit includes a resistor 82, a resistor 84, a capacitor 86, a resistor 88, and a resistor 90, all of which are connected in series between a source of positive voltage +Vs and ground potential. One conductor 78 connected to one end of the ignition current sensor coil 76 is connected to the junction between the resistor 84 and the capacitor 86, while the other conductor 78 connected to the other end of the ignition current sensor coil 76 is connected to the junction between the capacitor 86 and the resistor 88. The third conductor 80 is connected through a capacitor 92 to ground potential. The junction between the resistor 82 and the resistor 84 is connected to the cathode of a diode 94 and also to the non-inverting input of the above-discussed differential amplifier 26. The anode of the diode 94 is connected to ground potential. The junction between the resistor 88 and the resistor 90 is connected to the anode of a Schottky diode 96 and also to the inverting input of the differential amplifier 26. The cathode of the Schottky diode 96 is connected to the +Vs voltage source. The output of the differential amplifier 26 is connected to the above-described elements 34 through 50 of the filter network.

In operation, when an ignition pulse is generated in the ignition cable by the vehicle engine ignition system, a voltage differential is induced across the ignition current sensor coil 76. The capacitor 86 forms a loop with the ignition current sensor coil 76 and provides tuning for its inductance. The capacitor 92 provides a short circuit to ground potential for the high frequency components of the common mode noise signals. More importantly, however, the common mode noise signals are applied to the inputs of the differential amplifier 26 as described above, having little or no effect on the output signal therefrom.

In accordance with the provisions of the patent statutes, the principle and mode of operation of the present invention have been explained and illustrated in its preferred embodiment. However, it must be appreciated that the present invention can be practiced otherwise than as specifically explained and illustrated without departing from its spirit or scope.

What is claimed is:

1. An input circuit to an electronic speed control unit for a vehicle having an ignition system adapted to generate pulses of electrical current at a frequency proportional to engine speed comprising:

means responsive to each ignition system current pulse for generating a voltage differential signal;

biasing means for generating bias signals defining a predetermined voltage differential range;

differential amplifier means connected to said voltage differential signal generating means and said biasing means for generating an output signal when said voltage differential signal exceeds said predetermined voltage differential range; and capacitive means connected to said voltage differential signal generating means for rejecting common mode signals superimposed on said voltage differential signal.

2. An input circuit to an electronic speed control system for a vehicle having an ignition system adapted to generate pulses of electrical current to an engine comprising:

an inductive ignition current sensor responsive to each of the ignition system current pulses for generating a voltage differential signal;

a first capacitor connected between an end of said ignition current sensor and a ground potential;

a second capacitor connected between another end of said ignition current sensor and the ground potential;

a resistive voltage divider network connected between a source of voltage at a predetermined level and the ground potential, and further connected to said ignition current sensor for generating bias signals defining a predetermined voltage differential range; and differential amplifier means responsive to said voltage differential signal and said bias signals for generating an output signal when said voltage differential signal exceeds said predetermined voltage differential range.

3. An input circuit to an electronic speed control unit for a vehicle having an ignition system adapted to generate pulses of electrical current at a frequency proportional to engine speed comprising:

means responsive to each ignition system current pulse for generating a voltage differential signal;

biasing means for generating bias signals defining a predetermined voltage differential range;

differential amplifier means connected to said voltage differential signal generating means and said biasing means for generating an output signal when said voltage differential signal exceeds said predetermined voltage differential range; and diode means connected between said differential amplifier means and said biasing means for limiting the magnitude of the signals applied to said differential amplifier means.

4. The invention defined in claim 1 wherein said voltage differential signal generating means includes an inductive ignition current sensor.

5. The invention defined in claim 1 further including means for filtering the output signal from said differential amplifier means such that one output signal is generated by said differential amplifier menas for each ignition system current pulse.

6. The invention defined in claim 5 wherein said filter means includes a capacitor connected between an output of said differential amplifier means and a ground potential.

7. The invention defined in claim 2 further including means for limiting the magnitude of the signals applied to said differential amplifier means.

8. The invention defined in claim 5 wherein said limiting means includes a first diode connected between said differential amplifier means and said voltage source and a second diode connected between said differential amplifier means and the ground potential.

9. The invention defined in claim 2 further including means for filtering the output signal from said differential amplifier means such that one output signal is generated by said differential amplifier means for each ignition system current pulse generated by the ignition system.

10. The invention defined in claim 2 wherein said filter means includes a capacitor connected between an output of said differential amplifier means and the ground potential.

11. The invention defined in claim 3 wherein said diode means includes a first diode having a cathode connected between said biasing means and said differential amplifier means and having an anode connected to a ground potential.

12. The invention defined in claim 11 wherein said diode means includes a second diode having an anode connected between said biasing means and said differential amplifier means and having a cathode connected to a source of voltage.

13. The invention defined in claim 1 wherein said means for rejecting common mode signals includes a first capacitor connected between one end of said voltage differential signal generating means and a ground potential.

14. The invention defined in claim 13 wherein said means for rejecting common mode signals further includes a second capacitor connected between the other end of said voltage differential signal generating means and said ground potential.

15. The invention defined in claim 14 wherein said biasing means includes a resistive voltage divider network connected between a source of voltage at a predetermined level and said ground potential, and further connected to said voltage differential signal generating means for generating bias signals defining a predetermined voltage differential range.

16. The invention defined in claim 15 wherein said resistive voltage divider network includes a first resistor connected to said source of voltage, a second resistor connected between said first resistor and the junction of said one end of said voltage differential signal generating means and said first capacitor, a third resistor connected to the junction of said other end of said voltage differential signal generating means and said second capacitor, and a fourth resistor connected between said third resistor and said ground potential.

17. The invention defined in claim 16 wherein said differential amplifier means includes a first input connected to the junction of said first and second resistors and a second input connected to the junction of said third and fourth resistors.

18. The invention defined in claim 17 further including diode means connected between said differential amplifier means and said biasing means for limiting the magnitude of the signals applied to said differential amplifier means.

19. The invention defined in claim 18 wherein said diode means includes a first diode having a cathode connected to said first input of said differential amplifier means and having an anode connected to said ground potential.

20. The invention defined in claim 19 wherein said diode means further includes a second diode having an anode connected to said second input of said differential amplifier and having a cathode connected to said source of voltage.

21. The invention defined in claim 1 wherein said means for rejecting common mode signals includes a first resistor connected between one end of said voltage differential signals generating means and one end of a first capacitor, the other end of said first capacitor being connected to a ground potential, and a second resistor connected between the other end of said voltage differential generating means and said one end of said first capacitor.

22. The invention defined in claim 21 wherein said means for rejecting common mode signals further includes a second capacitor connected between said one end and said other end of said voltage differential signals generating means.

23. The invention defined in claim 22 wherein said biasing means includes a resistive voltage divider network connected between a source of voltage at a predetermined level and said ground potential, and further connected to said voltage differential signal generating means for generating bias signals defining a predetermined voltage differential range.

24. The invention defined in claim 23 wherein said resistive voltage divider network includes a third resistor connected to said source of voltage, a fourth resistor connected between said third resistor and the junction of said one end of said voltage differential signal generating means and said first resistor, a fifth resistor connected to the junction of said other end of said voltage differential signal generating means and said second resistor, and a sixth resistor connected between said fifth resistor and said ground potential.

25. The invention defined in claim 24 wherein said differential amplifier means includes a first input connected to the junction of said third and fourth resistors and a second input connected to the junction of said fifth and sixth resistors.

26. The invention defined in claim 25 further including diode means connected between said differential amplifier means and biasing means for limiting the magnitude of the signals applied to said differential amplifier means.

27. The invention defined in claim 26 wherein said diode means includes a first diode having a cathode connected to said first input of said differential amplifier means and having an anode connected to said ground potential.

28. The invention defined in claim 27 wherein said diode means further includes a second diode having an anode connected to said second input of said differential amplifier and having a cathode connected to said source of voltage.

29. The invention defined in claim 1 wherein said voltage differential signal generating means includes a center-tapped inductive ignition current sensor and a first capacitor connected between said center tap of said inductive ignition current sensor and a ground potential.

30. The invention defined in claim 29 wherein said voltage differential signal generating means further includes a second capacitor connected between one end of said inductive ignition current sensor and the other end of said inductive ignition current sensor.

31. The invention defined in claim 30 wherein said biasing means includes a resistive voltage divider network connected between a source of voltage at a predetermined level and said ground potential, and further to said inductive ignition current sensor for generating bias signals defining a predetermined voltage range.

32. The invention defined in claim 31 wherein said resistive voltage divider network includes a first resistor connected to said source of voltage, a second resistor connected between said first resistor and the junction of said one end of said inductive ignition current sensor and said second capacitor, a third resistor connected to the junction of said other end of said inductive ignition current sensor and said second capacitor, and a fourth resistor connected between said third resistor and said ground potential.

33. The invention defined in claim 32 wherein said differential amplifier means includes a first input connected to the junction of said first and second resistors and a second input connected to the junction of said third and fourth resistors.

34. The invention defined in claim 33 further including diode means connected between said differential amplifier means and said biasing means for limiting the magnitude of the signals applied to said differential amplifier means.

35. The invention defined in claim 34 wherein said diode means includes a first diode having a cathode connected to said first input of said differential amplifier means and having an anode connected to said ground potential.

36. The invention defined in claim 35 wherein said diode means further includes a second diode having an anode connected to said second input of said differential amplifier means and having a cathode connected to said source of voltage.

* * * * *